Figure 1:
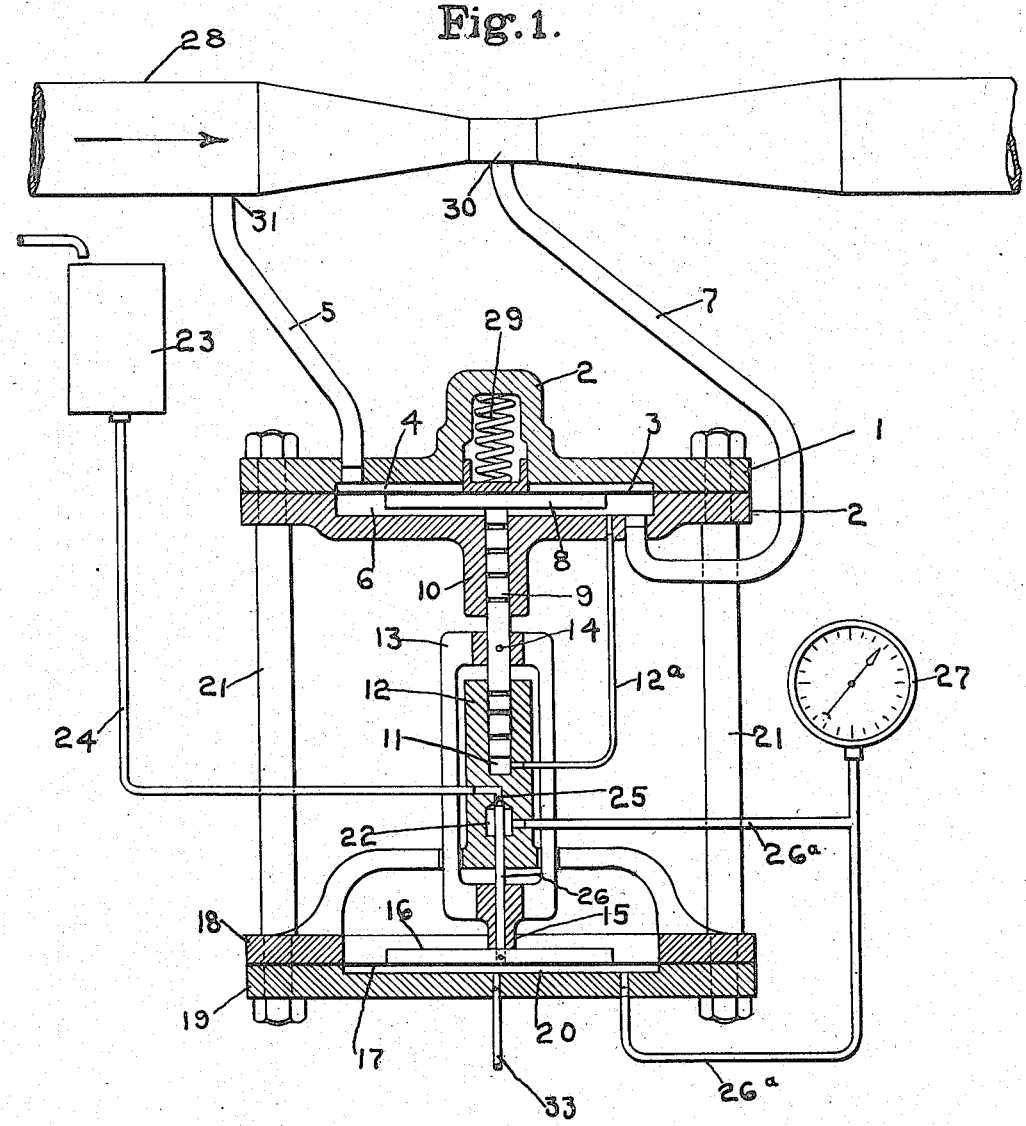

F. N. CONNET.
FLOW MEASURING DEVICE.
APPLICATION FILED JUNE 20, 1910.

1,129,073.

Patented Feb. 23, 1915.
2 SHEETS—SHEET 1.

WITNESSES
Herbert L. Kelley
E. J. Ogden

INVENTOR
Frederick N. Connet
BY
Howard E. Barlow
ATTORNEY

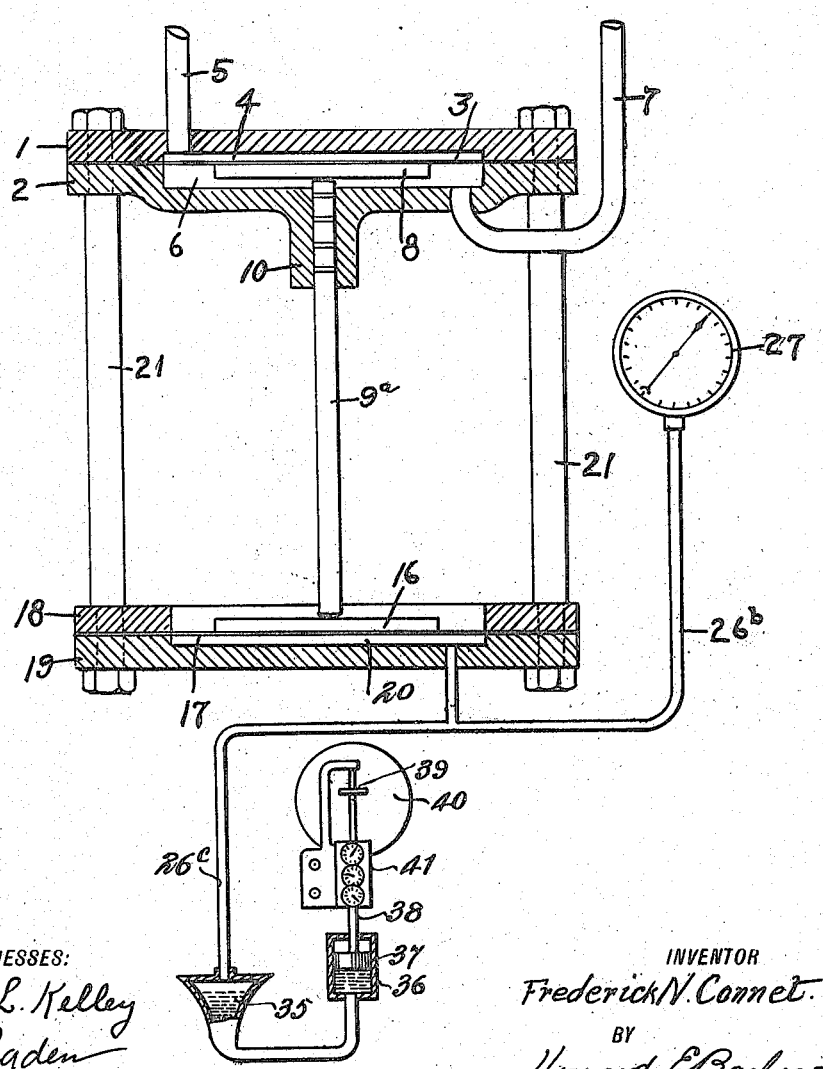

UNITED STATES PATENT OFFICE.

FREDERICK N. CONNET, OF PROVIDENCE, RHODE ISLAND.

FLOW-MEASURING DEVICE.

1,129,073.      Specification of Letters Patent.      Patented Feb. 23, 1915.

Application filed June 20, 1910. Serial No. 567,805.

*To all whom it may concern:*

Be it known that I, FREDERICK N. CONNET, a citizen of the United States, residing at Providence, in the county of Providence and State of Rhode Island, have invented certain new and useful Improvements in Flow-Measuring Devices, of which the following is a specification, reference being had therein to the accompanying drawing.

This invention has for its object to provide a simple and practical device which may be attached to a main fluid conduit having differential pressures due to the velocity of flow therethrough which I have called primary pressures, and means whereby a secondary pressure will be made equal or proportional to the difference in the primary pressures, so that the amount of the secondary pressure will indicate the rate of flow through the main conduit.

Numerous devices have been constructed in which two columns of mercury actuated by two different pressures in the main are employed as a medium for operating various means to show the rate of flow through the main, but these instruments are more or less complicated, and therefore expensive, and the mercury which is used in considerable quantities owing to the large pressures frequently involved adds materially to the expense of the instrument. I have therefore provided a device of simplified construction, by which the rate of flow, of either liquids or gases, through the main may be accurately ascertained without the use of mercury.

With these and other objects in view, the invention consists of certain novel features of construction, as will be fully described and particularly pointed out in the appended claims.

In the accompanying drawings:—Figure 1— is a diagrammatic and partial sectional view of my invention in one of its embodiments. Fig. 2— is a similar view illustrating another embodiment of the invention.

Similar reference characters indicate the same or similar parts in both views.

My improved device may be constructed in many different ways, two of which slightly differing from one another are shown in the two accompanying drawings, partly in section. In these drawings I have shown the device provided with an upper plate or head 1 and a lower plate 2, each centrally recessed. A diaphragm 3 is arranged to extend across said recessed portion and retained about its periphery between said plates forming an upper chamber 4 into which the high primary pressure is conducted through pipe 5 and lower chamber 6 into which the low primary pressure is conducted through pipe 7, the movement of said diaphragm being controlled by the varying differences between these pressures. Against the lower side of this diaphragm rests a plate 8 which serves as an abutment for the downwardly extending stem 9, which stem is held to reciprocate through the bearing 10 in the plate 2, its lower end as shown in Fig. 1 extending into chamber 11 in the fixed or rigidly held member 12. A pressure equalizing pipe 12ª connects this chamber 11 with chamber 6. A yoke 13 is secured as at 14 to reciprocate with this stem 9, its lower end 15 resting upon the upper face of plate 16, which latter rests upon a second diaphragm 17, the latter being held at its periphery between the ring 18 and the plate 19, the latter being recessed forming a pressure chamber 20 below the diaphragm to contain liquid to give what I have designated as a secondary pressure. This second diaphragm 17 is retained at a definite distance from the main diaphragm 3 by the tie rods 21—21. Said rods also serve in the construction shown, to bolt together each pair of plates containing the diaphragms. As further shown in Fig. 1 this fixed member 12 is provided with a small chamber 22 which may be connected with tank 23, or other convenient source of pressure through pipe 24, the pressure contained in pipe 24 being herein designated as an auxiliary pressure. The inlet opening 25 is controlled by the position of needle valve 26 which is secured to and operated by the diaphragm 17. The pressure from this chamber 22 is conducted to the chamber 20 below the diaphragm 17 through the pipe 26ª. A simple gage 27, or other suitable instrument may now be attached to this chamber 20 and properly graduated to show by its reading the amount which passes through the main conduit 28, since the pressure in said chamber is by the means described in this specification made a function of the flow in the conduit 28.

In Fig. 2, the chamber 22, tank 23, pipe 24, with its opening 25 and needle valve 26 are omitted, and the chamber 20 and a pipe 26ᶜ communicating therewith are filled with a permanent quantity of water, oil, or other liquid, and a rigid stem 9ª is mounted between the plates 8 and 16 of the diaphragms 3 and 17 respectively. Figs. 1 and 2 serve to indicate only two of many forms my device may take, but of these two I prefer that shown in Fig. 1 and will more particularly describe the operation of that form, as follows: The liquid or gas flows through the tube 28 in the direction of the arrow. This tube 28 in practice will frequently be below the device instead of above as shown in the drawing. The high pressure or up-stream side of the tube 28 is connected at 31 through the pipe 5 to the chamber 4 on one side of the diaphragm 3, and the throat or reduced pressure portion 30 in the tube is connected through pipe 7 to chamber 6 on the opposite side of said diaphragm. When there is no flow through the tube, the pressure at all points therein is of course equal, and ordinarily the indicator or gage 27 would stand at zero, but in the form shown in Fig. 1 I have inserted a spring 29 which presses the diaphragm 3 gently downward causing the gage to indicate a definite amount above the actual differences from which as a starting point the gage will be graduated and the actual difference in pressure will be figured. The use of this spring is not absolutely necessary to the operation of my device, but is simply for the purpose of compensating for inaccuracies which are usual in the ordinary spring actuated gage when starting from zero. As soon as the flow begins, the pressure in the throat 30 becomes less than that at the point 31, therefore the diaphragm 3 is pressed downwardly and through the stem 9 and yoke 13 presses on the second diaphragm 17 and withdraws the needle 26 from its seat, opening aperture 25 and admitting the auxiliary pressure from pipe 24, (which must necessarily always be sufficient to bring the pressures above and below the diaphragm 3 into equilibrium), to pass by way of pipe 26ª around beneath said diaphragm 17 until the secondary pressure in chamber 20 equalizes the difference between the two primary pressures, carrying upwardly the needle valve and closing the aperture 25. In order to make the diaphragm 17 sensitive to work in both directions I have provided a small vent 33 or bleed pipe thereby keeping a constant but mild circulation of the fluid under the secondary pressure. It will now be seen from the above that when the device is constructed as in Fig. 1 of the drawings the secondary pressure in chamber 20 and pipe 26ª exactly balances the difference between the pressures at the two points in the main and any means may be connected to this secondary pressure chamber to be actuated by the said fluid for showing the amount which passes through the main.

In Fig. 2, there is no tank 23 or auxiliary pressure supplied thereby, but the liquid in chamber 20 and pipe 26ᵇ is compressed until the pressure therein, termed the secondary pressure, equals the difference between the primary pressures.

As shown in the drawings the diaphragms 3 and 17 are of equal area and the secondary pressure will therefore equal the difference between the primary pressures. But it may be advisable at times to make the secondary pressure either greater or less than the difference between the primary pressures and in some definite proportion of such difference. This will be readily accomplished by making diaphragm 17 smaller or larger than diaphragm 3, but I have intended to use the word proportional in the claims to cover not only a structure where the diaphragms are unequal but also where they are equal.

The term gage for the device indicated at 27 is employed for brevity of description and not of limitation. Any device which will show to the user the information intended to be imparted by the whole mechanism may be employed as the gage referred to in the claims. The word "receptacle" in the claims is understood to include the supply pipe or conduit as well as any other chamber in which the secondary pressure may be held or passed through.

A further exemplification of integrating mechanism is shown in Fig. 2 attached to pipe 26ᵇ, in which the pipe 26ᶜ leads to a mercury well 35 communicating with the cylinder 36. In this cylinder floats the piston 37 to which is connected the rod 38 which controls, through the varying intensity of pressure in pipe 26ᵇ by mechanism not shown, the vertical position of the friction counter driving wheel 39 on the disk 40, which is driven by block mechanism, not shown, whereby the action of the counter 41 is controlled so that its readings will show the total quantity of fluid which has passed through the main conduit.

My invention is not restricted to the construction of apparatus and arrangement of parts as herein shown and described as the same may be modified in any desired way to perform the function of causing the difference between two fluid pressures to regulate a second fluid pressure and make the latter equal or proportional to said difference.

I have shown the different pressures as operating through the movement of diaphragms, but any other suitable equivalent for said diaphragms may be employed if desired. I have also shown my device as being connected to a Venturi tube, but I do not wish to be restricted to the connection of this device to such a tube, as the same may be connected to any main conduit having different pressure at different points due to the flow through the conduit, and any mechanism adapted to be so connected as to perform such function will fall within the spirit and scope of my invention, one practical embodiment of which in two slightly varying forms has been herein illustrated and described without attempting to show all of the various forms and modifications in which my invention might be embodied.

Having thus described my invention, what I claim is:

1. In a fluid measuring device, a diaphragm, a stem secured to said diaphragm, a yoke secured to said stem, means controlled by the flow through a main for producing a difference in pressure against opposite sides of said diaphragm whereby the latter and said yoke are caused to move; a stationary member having a secondary pressure chamber therein, means for supplying secondary pressure to said chamber, means controlled by the movement of said yoke for regulating the amount of secondary pressure supplied to said chamber whereby said difference of pressure is equalized, and means for measuring said secondary pressure.

2. In a fluid measuring device, a diaphragm, a stem secured to said diaphragm, a yoke secured to said stem, means controlled by the flow through a main for producing a difference in pressure against opposite sides of said diaphragm whereby the latter and said yoke are caused to move; a stationary member having a secondary pressure chamber therein, means for supplying secondary pressure to said chamber, a valve operated by the movement of said yoke for regulating the amount of said secondary pressure supplied to said chamber whereby said difference of pressure is equalized, and means for measuring said secondary pressure.

3. In a fluid measuring device, a diaphragm, a stem secured to said diaphragm, a yoke secured to said stem, means controlled by the flow through a main for producing a difference in pressure against opposite sides of said diaphragm whereby the latter and said yoke are caused to move, a member disposed within said yoke and having a valve chamber therein, a stationary member having a secondary pressure chamber therein, a source of secondary pressure, a conduit leading from said source to said valve chamber, a conduit leading from said valve chamber to said secondary pressure chamber, a valve operated by the movement of said yoke to control the amount of secondary pressure admitted to said secondary pressure chamber, whereby said difference of pressure is equalized, and means for measuring said secondary pressure.

4. In a fluid measuring device, a diaphragm, a stem secured to said diaphragm, a yoke secured to said stem, means controlled by the flow through a main for producing a difference in pressure against opposite sides of said diaphragm whereby the latter and said yoke are caused to move, a member disposed within said yoke and having a valve chamber therein, a stationary member having a secondary pressure chamber therein, a diaphragm composing the upper wall of said secondary pressure chamber, said diaphragm being connected to the lower end of said yoke, a source of secondary pressure, a conduit leading from said source to said valve chamber, a conduit leading from said valve chamber to said secondary pressure chamber, and a valve in said valve chamber controlled by the movement of said yoke to regulate the amount of secondary pressure supplied to said secondary chamber, whereby said difference of pressure is equalized, and means for measuring said secondary pressure.

In testimony whereof I affix my signature in presence of two witnesses.

FREDERICK N. CONNET.

Witnesses:
FREDERIC A. GREENE,
E. I. OGDEN.